United States Patent
Choi et al.

(10) Patent No.: US 10,903,486 B2
(45) Date of Patent: Jan. 26, 2021

(54) POSITIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

(71) Applicant: L&F CO., LTD., Daegu (KR)

(72) Inventors: Su An Choi, Seongnam-si (KR); Sang Hoon Jeon, Daegu (KR); Chang Min Choi, Miryang-si (KR); Su Youn Kwon, Gyeongsangbuk-do (KR); Jeong A Gu, Daegu (KR); Bong Jun Jeong, Daegu (KR)

(73) Assignee: L&F CO., LTD., Daegu (KR)

( * ) Notice: Subject to any disclaimer, the term of this patent is extended or adjusted under 35 U.S.C. 154(b) by 527 days.

(21) Appl. No.: 15/221,249

(22) Filed: Jul. 27, 2016

(65) Prior Publication Data

US 2016/0336595 A1    Nov. 17, 2016

Related U.S. Application Data

(63) Continuation of application No. PCT/KR2014/002355, filed on Mar. 20, 2014.

(30) Foreign Application Priority Data

Jan. 29, 2014 (KR) .......... 10-2014-0011607

(51) Int. Cl.
| | |
|---|---|
| *H01M 4/13* | (2010.01) |
| *H01M 4/58* | (2010.01) |
| *H01M 6/00* | (2006.01) |
| *H01M 4/36* | (2006.01) |
| *H01M 10/052* | (2010.01) |

(Continued)

(52) U.S. Cl.
CPC ......... *H01M 4/366* (2013.01); *H01M 4/0471* (2013.01); *H01M 4/131* (2013.01); *H01M 4/1391* (2013.01); *H01M 4/483* (2013.01); *H01M 4/485* (2013.01); *H01M 4/505* (2013.01); *H01M 4/525* (2013.01); *H01M 4/62* (2013.01);

(Continued)

(58) Field of Classification Search
None
See application file for complete search history.

(56) References Cited

U.S. PATENT DOCUMENTS

| | | | | |
|---|---|---|---|---|
| 2002/0071991 A1* | 6/2002 | Kweon | ............... | H01M 4/131 |
| | | | | 429/231.1 |
| 2007/0166617 A1* | 7/2007 | Gozdz | ............... | H01M 4/133 |
| | | | | 429/231.95 |
| 2011/0076556 A1 | 3/2011 | Kandasamy et al. | | |

FOREIGN PATENT DOCUMENTS

| | | | | |
|---|---|---|---|---|
| JP | 2008103204 A | * | 5/2008 | ............ H01M 4/58 |
| KR | 1020020024520 | | 3/2002 | |

(Continued)

*Primary Examiner* — Cynthia H Kelly
(74) *Attorney, Agent, or Firm* — Alston & Bird LLP

(57) ABSTRACT

A positive active material for a rechargeable lithium battery, a method for manufacturing the same, and a rechargeable lithium battery including the same are provided. A positive active material for a rechargeable lithium battery includes a compound that is capable of reversibly intercalating or deintercalating lithium, wherein the compound is formed of a core portion and a coating layer, the core portion is doped with M, and the coating layer includes Al and B, wherein M is Zr, Ti, Mg, Ca, Al, B, V, Zn, Mo, Ni, Co, Mn, or a combination thereof.

10 Claims, 5 Drawing Sheets

(51) Int. Cl.
*H01M 4/505* (2010.01)
*H01M 4/525* (2010.01)
*H01M 4/62* (2006.01)
*H01M 4/04* (2006.01)
*H01M 4/131* (2010.01)
*H01M 4/1391* (2010.01)
*H01M 4/48* (2010.01)
*H01M 4/485* (2010.01)
*H01M 10/0525* (2010.01)

(52) U.S. Cl.
CPC ..... *H01M 10/052* (2013.01); *H01M 10/0525* (2013.01)

(56) References Cited

FOREIGN PATENT DOCUMENTS

| | | |
|---|---|---|
| KR | 1020110019574 | 2/2011 |
| KR | 102011006335 | 6/2011 |
| KR | 1020130065694 | 6/2013 |

* cited by examiner

POSITIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

CROSS-REFERENCE TO RELATED APPLICATIONS

This application is a continuation-in-part of PCT/KR2014/002355, filed on 20 Mar. 2014, which claims the benefit of priority of Korean Application No. 10-2014-0011607 filed on 29 Jan. 2014, the contents of which are incorporated herein by reference in their entirety for all purposes.

TECHNICAL FIELD

An exemplarily embodiment of the present invention relates to a positive active material for a rechargeable lithium battery, a method for manufacturing the same, and a rechargeable lithium battery including the same.

BACKGROUND

In recent times, portable electronic equipment with reduced size and weight have been increasingly used in accordance with development of electronics industries.

Batteries generate electrical power using an electrochemical reaction material for a positive electrode and a negative electrode. Lithium rechargeable batteries generate electrical energy due to chemical potential changes during intercalation/deintercalation of lithium ions at positive and negative electrodes.

The lithium rechargeable batteries include a material reversibly intercalating or deintercalating lithium ions during charge and discharge reactions as both positive and negative active materials, and are filled with an organic electrolyte or a polymer electrolyte between the positive and negative electrodes.

For the positive active material for a rechargeable lithium battery, metal oxide composites such as LiCoO2, LiMn2O4, LiNiO2, LiMnO2, and the like are used.

Among the positive active materials, a manganese-based positive active material such as LiMn2O4 and LiMnO2 is easy to synthesize, costs less than other materials, has excellent thermal stability compared to other active materials, and is environmentally friendly. However, this manganese-based material has relatively low capacity.

LiCoO2 has good electrical conductivity, a high cell voltage of about 3.7 V, and excellent cycle-life, stability, and discharge capacity, and thus is a presently-commercialized representative material. However, LiCoO2 is so expensive that makes up more than 30% of the cost of a battery, and thus may reduce price competitiveness.

In addition, LiNiO2 has the highest discharge capacity among the above positive active materials but is hard to synthesize. Furthermore, nickel therein is highly oxidized and may deteriorate the cycle-life of a battery and an electrode, and thus may have severe deterioration of self-discharge and reversibility. Further, it may be difficult to commercialize due to incomplete stability.

SUMMARY

The present invention has been made in an effort to provide a positive active material for a rechargeable lithium battery having has an excellent life-span characteristic at high temperature and high-voltage condition, a method for manufacturing the same, and a rechargeable lithium battery including the same A positive active material for a rechargeable lithium battery, according to an exemplary embodiment of the present invention includes a compound that is capable of reversibly intercalating or deintercalating lithium, wherein the compound is formed of a core portion and a coating layer, the core portion is doped with M, and the coating layer comprises Al and B (here, M is Zr, Ti, Mg, Ca, Al, B, V, Zn, Mo, Ni, Co, Mn, or a combination thereof).

A mole doping ratio of M may be 0.001 to 0.01.

In addition, the compound may be at least one of $Li_aA_{1-b}X_bD_2$ ($0.90 \le a \le 1.8$, $0 \le b \le 0.5$), $Li_aA_{1-b}X_bO_{2-c}T_c$ ($0.90 \le a \le 1.8$, $0 \le b \le 0.5$, $0 \le c \le 0.05$), $LiE_{1-b}X_bO_{2-c}D_c$ ($0 \le b \le 0.05$, $0 \le c \le 0.05$), $LiE_{2-b}X_bO_{4-c}T_c$ ($0 \le b \le 0.5$, $0 \le c \le 0.05$), $Li_aNi_{1-b-c}Co_bX_cD_\alpha$ ($0.90 \le a \le 1.8$, $0 \le b \le 0.5$, $0 \le c \le 0.05$, $0 < \alpha \le 2$), $Li_aNi_{1-b-c}Co_bX_cO_{2-\alpha}T_\alpha$ ($0.90 \le a \le 1.8$, $0 \le b \le 0.5$, $0 \le c \le 0.05$, $0 < \alpha < 2$), $Li_aNi_{1-b-c}Co_bX_cO_{2-\alpha}T_2$ ($0.90 \le a \le 1.8$, $0 \le b \le 0.5$, $0 \le c \le 0.05$, $0 < \alpha \le 2$), $Li_aNi_{1-b-c}Mn_bX_cO_{2-\alpha}T_\alpha$ ($0.90 \le a \le 1.8$, $0 \le b \le 0.5$, $0 \le c \le 0.05$, $0 < \alpha \le 2$), $Li_aNi_{1-b-c}Mn_bX_cO_{2-\alpha}T_\alpha$ ($0.90 \le a \le 1.8$, $0 \le b \le 0.5$, $0 \le c \le 0.05$, $0 < \alpha < 2$), $Li_aNi_{1-b-c}Mn_bX_cO_{2-\alpha}T_2$ ($0.90 \le a \le 1.8$, $0 \le b \le 0.5$, $0 \le c \le 0.05$, $0 < \alpha < 2$), $Li_aNi_bE_cG_dO_{2-e}T_e$ ($0.90 \le a \le 1.8$, $0 \le b \le 0.9$, $0 \le c \le 0.5$, $0.001 \le d \le 0.1$, $0 \le e \le 0.05$), $Li_aNi_bCo_cMn_dG_eO_{2-f}T_f$ ($0.90 \le a \le 1.8$, $0 \le b \le 0.9$, $0 \le c \le 0.5$, $0 \le d \le 0.5$, $0.001 \le e \le 0.1$, $0 \le f \le 0.05$), $Li_aNiG_bO_{2-c}T_c$ ($0.90 \le a \le 1.8$, $0.001 \le b \le 0.1$, $0 \le c \le 0.05$), $Li_aCoG_bO_{2-c}T_c$ ($0.90 \le a \le 1.8$, $0.001 \le b \le 0.1$, $0 \le c \le 0.05$), $Li_aMnG_bO_{2-c}T_c$ ($0.90 \le a \le 1.8$, $0.001 \le b \le 0.1$, $0 \le c \le 0.05$), $Li_aMn_2G_bO_{2-c}T_c$ ($0.90 \le a \le 1.8$, $0.001 \le b \le 0.1$, $0 \le c \le 0.05$), $Li_aMnG_bPO_4$ ($0.90 \le a \le 1.8$, $0.001 \le b \le 0.1$), $LiNiVO_4$, and $Li_{(3-f)}J_2(PO_4)_3$ ($0 \le f \le 2$) (here, A is Ni, Co, Mn, or a combination thereof, X is Al, Ni, Co, Mn, Cr, Fe, Mg, Sr, V, a rare earth element, or a combination thereof, D is O, F, S, P, or a combination thereof, E is Co, Mn, or a combination thereof, T is F, S, P, or a combination thereof, G is Al, Cr, Mn, Fe, Mg, La, Ce, Sr, V, or a combination thereof, and J is V, Cr, Mn, Co, Ni, Cu, or a combination thereof).

A weight ratio of the coating layer with respect to a total weight of the entire positive active material may be 0.05.

The coating layer may be an island-type coating layer that is partially located in the surface of the compound.

Surface polarity of the coating layer may be 5 mN/m to 30 mN/m.

According to another exemplary embodiment of the present invention, a method for manufacturing a positive active material for a rechargeable lithium battery is provided. The method includes: dry-mixing a lithium supply material, a transition metal precursor, and an M supply material and then baking a first mixture to form a lithium complex compound; mixing the lithium complex compound, an Al supply material, and a B supply material and attaching a second mixture to the surface of the lithium complex compound; thermally treating the compound where the second mixture is attached; and acquiring a positive active material for a rechargeable lithium battery that includes a core including an M-doped compound and a coating layer disposed in the surface of the core and including Al and B (here, M is Zr, Ti, Mg, Ca, Al, B, V, Zn, Mo, Ni, Co, Mn, or a combination thereof).

When the lithium complex compound is formed by baking the first mixture, a baking temperature may be 700° C. to 1,050° C.

When thermally treating the compound where the second mixture is attached, a thermal treatment temperature may be 300° C. to 500° C.

According to another exemplary embodiment of the present invention, a rechargeable lithium battery is provided. The rechargeable lithium battery includes: a positive electrode including a positive active material of any one of claim 1 to claim 7; a negative electrode including a negative active material; and an electrolyte.

According to the exemplary embodiments of the present invention, a positive active material for a rechargeable lithium battery having an excellent battery characteristic, a method for manufacturing the same, and a rechargeable battery including the same can be provided.

DETAILED DESCRIPTION

Figure 1:
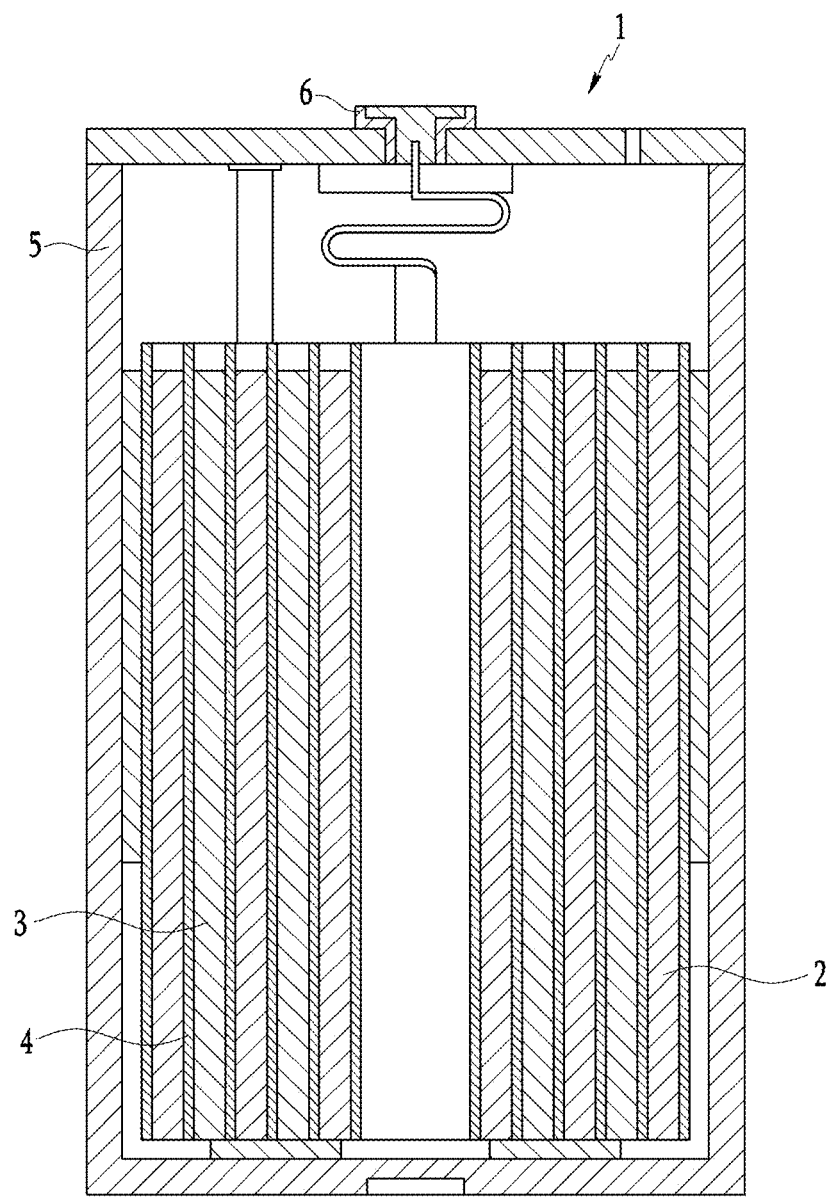
FIG. 1 is a schematic diagram of a rechargeable lithium battery.

Hereinafter, an exemplary embodiment of the present invention will be described in detail. However, these embodiments are exemplary, the present invention is not limited thereto, and the present invention is defined by the scope of claims.

First, in an exemplary embodiment of the present invention, a compound that can reversibly intercalate and deintercalate lithium is prepared, wherein the compound is formed of a core portion and a coating layer, the core portion is doped with M, and the coating layer includes Al and B.

More particularly, the positive active material can improve battery characteristics of the rechargeable lithium battery. In detail, according to the exemplary embodiment of the present invention, the positive active material including a complex coating layer can provide a more improved life-span characteristic in a high-temperature and high-voltage environment than a positive active material that does not include the complex coating layer.

The compound that can reversibly intercalate and deintercalate lithium is doped with M, wherein M may be a metal such as Zr, Ti, Mg, Ca, Al, B, V, Zn, Mo, Ni, Co, Mn, or a combination thereof.

For example, the M may be Zr, Ti, or a combination thereof, but the present invention is not limited thereto.

A mole doping ratio of the M may be 0.001 to 0.01.

When the mole doping ratio is below 0.001, doping may not provide a desired effect, and when the mole doping ratio exceeds 0.01, initial capacity may be excessively reduced and thus an efficiency characteristic may be decreased.

A precursor and a doping source material may be baked together in order to dope M to the compound, and in this case, the precursor may be partially doped to the M. In this case, an effective baking temperature may be 700° C. to 1,050° C.

When the baking temperature is lower than 700° C., the battery characteristics may be suddenly deteriorated at high temperature and room temperature. Further, when the baking temperature exceeds 1,050° C., capacity and capacity retention may be suddenly deteriorated.

The doping enables not only surface modification but also core structure stabilization in a conventional surface coating method such that life-span degradation of the battery at a high temperature of 45° C. and a high voltage of 45 V can be prevented from occurring.

In detail, for example, the compound reversibly intercalating and deintercalating lithium may be at least one of $Li_aA_{1-b}X_bD_2$ (0.90≤a≤1.8, 0≤b≤0.5), $Li_aA_{1-b}X_bO_{2-c}T_c$ (0.90≤a≤1.8, 0≤b≤0.5, 0≤c≤0.05), $LiE_{1-b}X_bO_{2-c}D_c$ (0≤b≤0.05, 0≤c≤0.05), $LiE_{2-b}X_bO_{4-c}T_c$ (0≤b≤0.5, 0≤c≤0.05), $Li_aNi_{1-b-c}Co_bX_cD_\alpha$ (0.90≤a≤1.8, 0≤b≤0.5, 0≤c≤0.05, 0<α≤2), $Li_aNi_{1-b-c}Co_bX_cO_{2-\alpha}T_\alpha$ (0.90≤a≤1.8, 0≤b≤0.5, 0≤c≤0.05, 0<α<2), $Li_aNi_{1-b-c}Co_bX_cO_{2-\alpha}T_2$ (0.90≤a≤1.8, 0≤b≤0.5, 0≤c≤0.05, 0<α≤2), $Li_aNi_{1-b-c}Mn_bX_cD_\alpha$ (0.90≤a≤1.8, 0≤b≤0.5, 0≤c≤0.05, 0<α≤2), $Li_aNi_{1-b-c}Mn_bX_cO_{2-\alpha}T_\alpha$ (0.90≤a≤1.8, 0≤b≤0.5, 0≤c≤0.05, 0<α<2), $Li_aNi_{1-b-c}Mn_bX_cO_{2-\alpha}T_2$ (0.90≤a≤1.8, 0≤b≤0.5, 0≤c≤0.05, 0<α<2), $Li_aNi_bE_cG_dO_{2-e}T_e$ (0.90≤a≤1.8, 0≤b≤0.9, 0≤c≤0.5, 0.001≤d≤0.1, 0≤e≤0.05), $Li_aNi_bCo_cMn_dG_eO_{2-f}T_f$ (0.90≤a≤1.8, 0≤b≤0.9, 0≤c≤0.5, 0≤d≤0.5, 0.001≤e≤0.1, 0≤e≤0.05), $Li_aNiG_bO_{2-c}T_c$ (0.90≤a≤1.8, 0.001≤b≤0.1, 0≤c≤0.05), $Li_aCoG_bO_{2-c}T_c$ (0.90≤a≤1.8, 0.001≤b≤0.1, 0≤c≤0.05), $Li_aMnG_bO_{2-c}T_c$ (0.90≤a≤1.8, 0.001≤b≤0.1, 0≤c≤0.05), $Li_aMn_2G_bO_{2-c}T_c$ (0.90≤a≤1.8, 0.001≤b≤0.1, 0≤c≤0.05), $Li_aMnG_bPO_4$ (0.90≤a≤1.8, 0.001≤b≤0.1), $LiNiVO_4$, and $Li_{(3-f)}J_2(PO_4)_3$ (0≤f≤2).

In this case, A may be Ni, Co, Mn, or a combination thereof, X may be Al, Ni, Co, Mn, Cr, Fe, Mg, Sr, V, a rare earth element, or a combination thereof, D may be O, F, S, P, or a combination thereof, E may be Co, Mn, or a combination thereof, T may be F, S, P, or a combination thereof, G may be Al, Cr, Mn, Fe, Mg, La, Ce, Sr, V, or a combination thereof, and J may be V, Cr, Mn, Co, Ni, Cu, or a combination thereof.

Meanwhile, as previously described, the coating layer of the compound reversibly intercalating and deintercalating lithium includes Al and B supply materials.

In this case, the weight of the coating layer may be 0.05 wt % to 0.5 wt % with respect to a total weight of the positive active material.

Here, compared to a conventional even-coating layer, the coating layer may be an island-type coating layer that is unevenly and partially located at the surface of the compound.

In case of such an island-type coating layer, the coating layer selectively reacts with specific active sites on the active material surface such that battery characteristics and thermal stability can be improved while providing significant side reaction control.

In the positive active material including the coating layer that includes the Al and B supply materials, polarity, which is a surface free energy component, has a value as low as 5 to 30 mN/m compared to a positive active material including a single coating layer that includes Al or B. Such a result is measured from the following Experimental Example 2, and this will be described in detail later.

The low polarity decreases surface energy to thereby prevent the surface of the positive active material from excessive wetting by an electrolyte solution, and a side reaction due to the electrolyte solution and resistance increase of the battery are suppressed, thereby providing a positive active material having an excellent life-span characteristic.

Meanwhile, in another exemplary embodiment of the present invention, a method for manufacturing a positive active material for a rechargeable lithium battery is provided. The method includes: forming a lithium complex compound by forming a first mixture by dry-mixing a lithium supply material and then baking the first mixture; forming a second mixture by dry-mixing the lithium complex compound, an Al supply material, and a B supply material and then attaching the second mixture to the surface of the lithium complex compound; thermal-treating the compound to which the second mixture is attached; and acquiring a positive active material for a rechargeable lithium battery that includes a core including an M-doped compound and a coating layer disposed in the surface of the core and including Al and B.

Here, M may be Zr, Ti, Mg, Ca, Al, B, V, Zn, Mo, Ni, Co, Mn, or a combination thereof.

In this case, an effective baking temperature for baking the first mixture so as to form a lithium complex compound may be 700° C. to 1,050° C.

Here, when the baking temperature is below 700° C., battery characteristics at room temperature and high temperature may be suddenly deteriorated. In addition, when the baking temperature exceeds 1,050° C., capacity and capacity retention may be suddenly deteriorated.

Further, an effective baking temperature for thermal treatment of the compound to which the second mixture is attached may be 300° C. to 500° C.

Here, when the baking temperature is below 300° C., reactivity between a coating material and the positive active material is decreased so that the coating material may be separated. In addition, when the baking temperature exceeds 500° C., the Al and B supply materials are excessively attached to the compound such that initial capacity of the battery may be decreased and a life-span characteristic of the battery at room temperature, high temperature, and low temperature may be deteriorated.

The manufactured positive active material is the same as that of the previously-described exemplary embodiment of the present invention, and therefore no further description will be provided.

In another exemplary embodiment of the present invention, a rechargeable lithium battery is provided. The rechargeable lithium battery includes a positive electrode, a negative electrode, and an electrolyte, wherein the positive electrode includes a current collector and a positive active material layer provided on the current collector, and the positive active material layer includes the above-mentioned positive active material.

The positive active material of the present exemplary embodiment is the same as that of the above-described exemplary embodiment of the present invention, and therefore no further description will be provided.

The positive active material layer may include a binder and a conductive material.

The binder serves to appropriately bind positive active material particles to each other and appropriately bind the positive active material to the current collector. As a representative example of the binder, polyvinyl alcohol, carboxymethyl cellulose, hydroxypropyl cellulose, diacetyl cellulose, polyvinylchloride, carboxylated polyvinylchloride, polyvinylfluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, nylon, or the like, may be used, but the binder is not limited thereto.

The conductive material is used in order to impart conductivity to an electrode, and any material may be used as long as it does not cause chemical changes in a battery to be configured, and is an electron-conductive material. As an example, a conductive material including a carbon-based material such as natural graphite, artificial graphite, carbon black, acetylene black, Ketjen black, carbon fiber, or the like; a metal-based material such as metal powder or metal fiber of copper, nickel, aluminum, silver, or the like; a conductive polymer such as a polyphenylene derivative or the like; or a mixture thereof may be used.

The negative electrode includes a current collector, and a negative material layer formed on the current collector, wherein the negative active material layer contains a negative active material.

An example of the negative active material includes a material capable of reversibly intercalating and deintercalating lithium ions, a lithium metal, a lithium metal alloy, a material capable of doping and dedoping lithium, or a transition metal oxide.

As the material capable of reversibly intercalating and deintercalating lithium ions, any carbon-based anode active material may be used as long as it is generally used as a carbon material in a lithium ion secondary battery. As a representative example, crystalline carbon or amorphous carbon may be used, or crystalline carbon and amorphous carbon may be used together with each other. Examples of the crystalline carbon may include non-shaped or sheet, flake, spherical, or fiber-shaped natural graphite or artificial graphite, and examples of the amorphous carbon may include soft carbon (low-temperature fired carbon), hard carbon, mesophase pitch carbide, fired cokes, and the like.

As the lithium metal alloy, an alloy of lithium and a metal selected from the group consisting of Na, K, Rb, Cs, Fr, Be, Mg, Ca, Sr, Si, Sb, Pb, In, Zn, Ba, Ra, Ge, Al, and Sn may be used.

Examples of the material capable of doping and dedoping lithium may include Si, SiOx ($0<x<2$), a Si—Y alloy (Y is an element selected from the group consisting of alkali metals, alkali earth metals, group 13 elements, group 14 elements, transition metals, rare earth elements, and a combination thereof, but is not Si), Sn, SnO2, Sn—Y (Y is an element selected from the group consisting of alkali metals, alkali earth metals, group 13 elements, group 14 elements, transition metals, rare earth elements, and a combination thereof, but is not Sn), and the like. In addition, at least one thereof may be mixed with SiO2 and then used. Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide may include vanadium oxide, lithium vanadium oxide, and the like.

The anode active material layer may also contain a binder, and selectively, the anode active material layer may further contain a conductive material.

The binder serves to appropriately bind negative active material particles to each other and appropriately bind the negative active material to the current collector. As a representative example of the binder, polyvinyl alcohol, carboxymethyl cellulose, hydroxypropyl cellulose, polyvinylchloride, carboxylated polyvinylchloride, polyvinylfluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, nylon, or the like, may be used, but the binder is not limited thereto.

The conductive material is used in order to impart conductivity to the electrode, and any material may be used as long as it does not cause chemical changes in a battery to be configured and is an electron-conductive material. As an example, a conductive material including a carbon-based material such as natural graphite, artificial graphite, carbon black, acetylene black, Ketjen black, carbon fiber, or the like; a metal-based material such as a metal powder or metal fiber of copper, nickel, aluminum, silver, or the like; a conductive polymer such as a polyphenylene derivative or the like; or a mixture thereof may be used.

As the current collector, a material selected from the group consisting of copper foil, nickel foil, stainless steel foil, titanium foil, nickel foam, copper foam, a polymer substrate coated with a conductive metal, and a combination thereof may be used.

As a material of the current collector, Al may be used, but the current collector is not limited thereto.

The positive electrode and the negative electrode may be manufactured by mixing active materials, the conductive material, and the binder in a solvent to prepare active material compositions, and applying the compositions on the current collector, respectively. Since a method of manufacturing an electrode as described above is well-known in the art, a detailed description thereof will be omitted in the present specification. As the solvent, N-methylpyrrolidone or the like may be used, but the solvent is not limited thereto.

The electrolyte may contain a non-aqueous organic solvent and a lithium salt.

The non-aqueous organic solvent may serve as a medium through which ions participating in electrochemical reactions of a battery may move.

As the non-aqueous organic solvent, a carbonate-based solvent, an ester-based solvent, an ether-based solvent, a ketone-based solvent, an alcohol-based solvent, or an aprotic solvent may be used. As the carbonate-based solvent, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like, may be used, and as the ester-based solvent, methyl acetate, ethyl acetate, n-propyl acetate, dimethylacetate, methylpropionate, ethylpropionate, γ-butyrolactone, decanolide, valerolactone, mevalonolactone, caprolactone, or the like, may be used. As the ether-based solvent, dibutyl ether, tetraglyme, diglyme, dimethoxyethane, 2-methyltetrahydrofuran, tetrahydrofuran, or the like, may be used, and as the ketone-based solvent, cyclohexanone, or the like, may be used. In addition, as the alcohol-based solvent, ethyl alcohol, isopropyl alcohol, or the like, may be used, and as the aprotic solvent, nitriles such as R—CN (R is a linear, branched, or cyclic hydrocarbon group having 2 to 20 carbon atoms and may include a double bond aromatic ring or an ether bond), amides such as dimethyl formamide, or the like, dioxolanes such as 1,3-dioxolane, or the like, sulfolanes, or the like, may be used.

The non-aqueous organic solvents may be used alone, or a mixture of at least two thereof may be used. In the case in which the mixture of at least two thereof is used, a mixing ratio may be appropriately adjusted depending on the desired performance of the battery, which may be obvious to those skilled in the art.

Further, in the case of the carbonate-based solvent, it is preferable to use a mixture of a cyclic carbonate and a chain carbonate. In this case, when the cyclic carbonate and the chain carbonate are mixed with each other in a volume ratio of 1:1 to 1:9, performance of the electrolyte may be excellent.

The non-aqueous organic solvent according to the exemplary embodiment of the present invention may further include an aromatic hydrocarbon-based organic solvent in addition to the carbonate-based solvent. In this case, the carbonate-based solvent and the aromatic hydrocarbon-based organic solvent may be mixed with each other in a volume ratio of 1:1 to 30:1.

As the aromatic hydrocarbon-based organic solvent, an aromatic hydrocarbon-based compound represented by the following Chemical Formula 1 may be used.

[Chemical Formula 1]

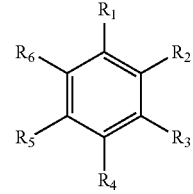

(In Chemical Formula 1, R1 to R6 are each independently hydrogen, a halogen, a (C1-C10) alkyl group, a haloalkyl group, or a combination thereof.)

The aromatic hydrocarbon-based organic solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a combination thereof.

The non-aqueous electrolyte may further contain vinylene carbonate or an ethylene carbonate-based compound represented by Chemical Formula 2 in order to improve cycle life of a battery.

[Chemical Formula 2]

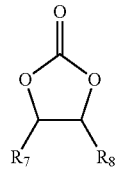

(In Chemical Formula 2, $R_7$ and $R_8$ are each independently hydrogen, a halogen group, a cyano (CN) group, a nitro ($NO_2$) group, or a (C1-C5) fluoroalkyl group, at least one of $R_7$ and $R_8$ being the halogen group, the cyano (CN) group, the nitro ($NO_2$) group, or the (C1-C5) fluoroalkyl group.)

A representative example of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, or the like. In the case of adding an additive for improving cycle life as described above, a usage amount thereof may be appropriately adjusted.

The lithium salt is a material dissolved in an organic solvent to serve as a lithium ion source in a battery to thereby enable a basic operation of a lithium secondary battery and promote movement of lithium ions between a positive electrode and a negative electrode. Representative examples of the lithium salt as described above may include one or more selected from the group consisting of $LiPF_6$, $LiBF_4$, $LiSbF_6$, $LiAsF_6$, $LiC_4F_9SO_3$, $LiClO_4$, $LiAlO_2$, $LiAlCl_4$, $LiN(CxF_{2x+1}SO_2CyF_{2y}+1SO_2)$ (where x and y are natural numbers), LiCl, LiI, and $LiB(C_2O_4)_2$ (lithium bis(oxalato) borate; LiBOB) as a supporting electrolytic salt. It is preferable that the lithium salt is used in a concentration range of 0.1 to 2.0 M. In the case in which the concentration of the lithium salt is within the above-mentioned range, since the electrolyte has suitable conductivity and viscosity, performance of the electrolyte may be excellent, and lithium ions may effectively move.

A separator may be present between the negative electrode and the anode depending on the kind of lithium secondary battery. As the separator as described above, a separator made of polyethylene, polypropylene, or polyvinylidene fluoride, or a multilayer separator having at least two layers made of these materials, may be used. Also, a mixed multilayer separator such as a polyethylene/polypropylene double-layered separator, a polyethylene/polypropylene/polyethylene triple-layered separator, polypropylene/polyethylene/polypropylene triple-layered separator, and the like, may be used.

Lithium secondary batteries may be classified as a lithium ion battery, a lithium ion polymer battery, and a lithium polymer battery depending on the kinds of separator and electrolyte used therein, may be classified as a cylindrical battery, a prismatic battery, a coin type battery, a pouch type battery, and the like, depending on a shape thereof, and may be classified as a bulk-type battery and a thin film-type battery depending on a size thereof. Since structures and manufacturing methods of these batteries are well-known in the art, a detailed description thereof will be omitted.

FIG. 1 schematically illustrates a representative structure of a lithium secondary battery according to the present invention. As shown in FIG. 1, the rechargeable lithium battery 1 includes a positive electrode 3, a negative electrode 2, a battery container 5 including an electrolyte impregnated in a separator 4 provided between the positive electrode 3 and the negative electrode 2, and an encapsulation member 6 encapsulating the battery container 5.

Hereinafter, examples and comparative examples of the present invention will be described. However, the following examples are provided only as examples of the present invention. Therefore, the present invention is not limited thereto.

EXAMPLES

Exemplary Embodiment 1

An NCM complex transition metal hydroxide (mole ratio of Ni:Co:Mn=60:20:20), a dispersed $ZrO_2$ powder, and $TiO_2$ powder were respectively dry-mixed with a weight ratio of 100:0.2:0.3 in a mixer and then baked for even attachment of the $ZrO_2$ powder and the $TiO_2$ powder to the surface of particles of the complex transition metal hydroxide, and then $Li_2CO_3$ was added with a ratio of 1.025 mol with respect to 1 mol (i.e., Li/Metal=1.025) of the complex transition metal hydroxide where the $ZrO_2$ powder and the $TiO_2$ powder were evenly attached to the surface thereof and then dry-mixed. Next, the dry-mixed power was thermally treated at 890° C. for about 8 h such that a lithium complex compound was manufactured.

Further, the manufactured lithium complex compound was dry-mixed with a weight ratio of a lithium complex compound:$Al(OH)_3$ powder:$B_2O_3$ powder=100:0.4:0.2 and then baked for even attachment of the dispersed $Al(OH)_3$ powder and $B_2O_3$ powder to the surface of the lithium complex compound. In addition, the dry-mixed powers were thermally treated at 400° C. for about 6 h such that a positive active material was manufactured.

In this case, a diameter of the positive active material was analyzed to be 10 μm. Here, the diameter may have a relationship with polarity that forms surface free energy of the positive active material. As the diameter is increased, polarity forming the surface free energy of the positive active material is decreased.

Exemplary Embodiment 2

Except that a diameter of the entire positive active material is 4 μm, a positive active material manufactured according to Exemplary Embodiment 2 is the same as that of Exemplary Embodiment 1.

Exemplary Embodiment 3

Except that a diameter of the entire positive active material is 6 μm, a positive active material manufactured according to Exemplary Embodiment 3 is the same as that of Exemplary Embodiment 1.

Exemplary Embodiment 4

Except that a diameter of the entire positive active material is 15 μm, a positive active material manufactured according to Exemplary Embodiment 4 is the same as that of Exemplary Embodiment 1.

Exemplary Embodiment 5

An NCM complex transition metal hydroxide (mole ratio of Ni:Co:Mn=60:20:20), a dispersed MgO powder, and $Al(OH)_3$ powder were respectively dry-mixed with a weight ratio of 100:0.2:0.3 in a mixer and then baked for even attachment of the MgO powder and $Al(OH)_3$ powder to the surface of particles of the complex transition metal hydroxide, and then $Li_2CO_3$ was added with a ratio of 1.025 mol with respect to 1 mol (i.e., Li/Metal=1.025) of the complex transition metal hydroxide where the MgO powder and $Al(OH)_3$ powder were evenly attached to the surface thereof and then dry-mixed. In addition, the dry-mixed power was thermally treated at 890° C. for about 8 h such that a lithium complex compound was manufactured.

Further, the manufactured lithium complex compound was dry-mixed with a weight ratio of the lithium complex compound:$Al(OH)_3$ powder:$B_2O_3$ powder=100:0.4:0.2 and then baked for even attachment of the dispersed $Al(OH)_3$ powder and $B_2O_3$ powder to the surface of the lithium complex compound. In addition, the dry-mixed powers were thermally treated at 400° C. for about 6 h such that a positive active material was manufactured.

Exemplary Embodiment 6

An NCM complex transition metal hydroxide (mole ratio of Ni:Co:Mn=60:20:20), a dispersed $B_2O_3$ powder, and $ZrO_2$ powder were respectively dry-mixed with a weight ratio of 100:0.2:0.3 in a mixer and then baked for even attachment of the $B_2O_3$ powder and $ZrO_2$ powder to the surface of particles of the complex transition metal hydroxide, and then $Li_2CO_3$ was added with a ratio of 1.025 mol with respect to 1 mol (i.e., Li/Metal=1.025) of the complex transition metal hydroxide where the $B_2O_3$ powder and $ZrO_2$ powder were evenly attached to the surface thereof and then dry-mixed. In addition, the dry-mixed power was thermally treated at 890° C. for about 8 h such that a lithium complex compound was manufactured.

Further, the manufactured lithium complex compound was dry-mixed with a weight ratio of the lithium complex compound:$Al(OH)_3$ powder:$B_2O_3$ powder=100:0.4:0.2 and then baked for even attachment of the dispersed $Al(OH)_3$ powder and $B_2O_3$ powder to the surface of the lithium complex compound. In addition, the dry-mixed powers were thermally treated at 400° C. for about 6 h such that a positive active material was manufactured.

Comparative Example 1

$Li_2CO_3$ was added to an NCM complex transition metal hydroxide with a ratio of Li/Metal=1.025 in a mixer and then dry-mixed. In addition, the dry-mixed power was thermally treated at 890° C. for about 8 h such that a positive active material was manufactured.

Comparative Example 2

An NCM complex transition metal hydroxide, $ZrO_2$ powder, and $TiO_2$ powder were dry-mixed in a mixer with a weight ratio of 100:0.2:0.3 (mole ratio of Ni:Co:Mn=60:20:20) for uniform attachment of the $ZrO_2$ powder and the $TiO_2$ powder to the particle surface of the complex transition metal hydroxide, and then $Li_2CO_3$ was added to the complex transition metal hydroxide evenly attached to the surface with a ratio of Li/Metal=1.025 and then dry-mixed. The dry-mixed power was thermally treated at 890° C. for about 8 h such that a positive active material was manufactured.

It was analyzed that a diameter of the positive active material was 10 µm.

Comparative Example 3

A lithium complex compound, which is the positive active material manufactured in Comparative Example 2, and $Al(OH)_3$ powder were dry-mixed with a weight ratio of 100:0.4 for uniform attachment to the surface of the lithium complex compound. In addition, the dry-mixed power were thermally treated at 400° C. for about 6 h such that a positive active material was manufactured.

It was analyzed that a diameter of the positive active material was 10 µm.

Comparative Example 4

A lithium complex compound, which is the positive active material manufactured in Comparative Example 2, and $B_2O_3$ powder were dry-mixed with a weight ratio of 100:0.2 for uniform attachment to the surface of the lithium complex compound. In addition, the dry-mixed power were thermally treated at 400° C. for about 6 h such that a positive active material was manufactured.

It was analyzed that a diameter of the positive active material was 10 µm.

Comparative Example 5

10 wt % of $B_2O_3$ powder was dissolved in 90 wt % of ethanol so as to manufacture a boron ethoxide solution. In addition, the positive active material having a diameter of 10 µm, manufactured in Comparative Example 2, was added to the boron ethoxide solution and then stirred using a stirrer to evenly coat the boron ethoxide solution to the surface of the positive active material such that slurry was manufactured.

Further, after drying the slurry, thermal treatment was performed at 300° C. for about 10 h such that positive active material power coated with a boron oxide was manufactured.

The positive active material primarily coated with boron oxide and 1 wt % of aluminum isopropoxide solution were used to manufacture a core-shell type of multi-layered positive active material power where aluminum oxide is secondarily coated.

Manufacturing of Coin Cell 95 wt % of the positive active material manufactured in the above-stated exemplary embodiments and comparative examples, 2.5 wt % of carbon black as a conductor, and 2.5 wt % of PVDF as a binder were added to 5.0 wt % of N-methyl-2-pyrrolidone (NMP) as a solvent to manufacture a positive electrode slurry.

The positive electrode slurry was coated to be 20 to 40 µm thick on an aluminum (Al) thin film as a positive electrode current collector, vacuum-dried, and roll-pressed, manufacturing a positive electrode.

As for a negative electrode, Li metal was used.

The positive electrode, the Li metal as a counter electrode, and a 1.15 M LiPF6 EC:DMC (1:1 vol %) electrolyte solution were used to manufacture a coin cell type half-cell.

Battery Characteristic Evaluation

The following Table 1 shows initial formation data (4.5 V), capacity data at 1st cycle, 20th cycle, and 30th cycle, and cycle life characteristic data in examples and comparative examples.

TABLE 1

| | Discharge Capacity (mAh/g) | Efficiency | 1CY discharge capacity | 20CY discharge capacity | 30CY discharge capacity | Lifespan characteristic (20CY/1CY, %) | Lifespan characteristic (30CY/1CY, %) |
|---|---|---|---|---|---|---|---|
| Exemplary embodiment1 | 200.2 | 90.2 | 198.5 | 191.2 | 186.1 | 96.3 | 93.8 |
| Exemplary embodiment5 | 199.8 | 90.1 | 198.1 | 190.4 | 187.1 | 96.1 | 94.4 |

TABLE 1-continued

|  | Discharge Capacity (mAh/g) | Efficiency | 1CY discharge capacity | 20CY discharge capacity | 30CY discharge capacity | Life-span characteristic (20CY/1CY, %) | Life-span characteristic (30CY/1CY, %) |
| --- | --- | --- | --- | --- | --- | --- | --- |
| Exemplary embodiment 6 | 199.4 | 90.3 | 197.8 | 190.5 | 186.3 | 96.3 | 94.2 |
| Comparative Example 1 | 198.2 | 89.6 | 197.1 | 175.3 | 156.7 | 88.9 | 79.5 |
| Comparative Example 2 | 199.4 | 90.6 | 197.6 | 184.3 | 172.9 | 93.3 | 87.5 |
| Comparative Example 3 | 203.1 | 90.1 | 199.9 | 187.3 | 178.0 | 93.7 | 89.0 |
| Comparative Example 4 | 201.2 | 89.1 | 199.0 | 189.9 | 182.3 | 95.4 | 91.6 |
| Comparative Example 5 | 201.8 | 90.4 | 199.2 | 190.6 | 183.4 | 95.7 | 92.1 |

As shown in Table 1, Exemplary Embodiment 1 where the core portion is doped with M (e.g., Ni—Co—Mn) and the coating layer includes Al and B has an excellent battery characteristic in terms of life-span compared to Comparative Example 1 to Comparative Example 5.

More particularly, compared to Comparative Example 3 and Comparative Example 4 where a coating layer is formed as a single coating layer including Al or B, an excellent life-span characteristic is shown at a high temperature and a high voltage in Exemplary Embodiment 1 where a coating layer is formed as a complex coating layer including both of Al and B.

Further, compared to Comparative Example 5, which is a conventional art, the excellent life-span characteristic is shown at a high temperature and a high voltage.

In addition, an excellent battery characteristic is shown in Exemplary Embodiments 5 and 6 where a different doping element is used.

Measurement of Surface Free Energy

Surface free energy of the positive active materials respectively manufactured in Exemplary Embodiments 1 to 4 and Comparative Examples 3 to 5 were measured. For the measurement, DSA100 and K10 equipment manufactured by KRUSS Ltd., were used and a contact angle method was used.

Figure 2:
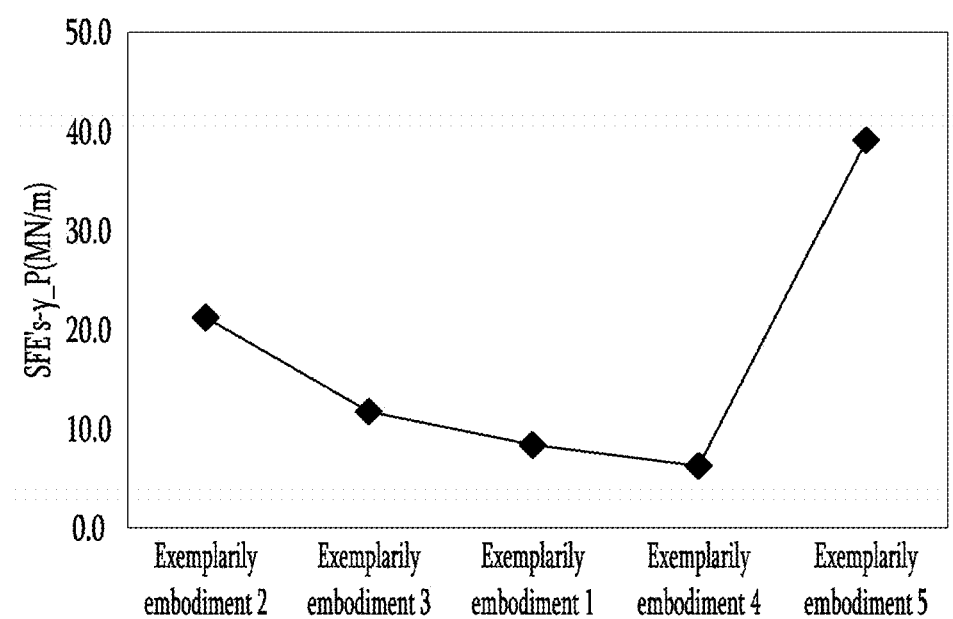
FIG. 2 shows a result of surface free energy of exemplary embodiments and comparative examples.

Table 2 and FIG. 2 show evaluation results respectively measured in the following experimental examples.

TABLE 2

|  | Diameter D50 | Polarity (mN/m) |
| --- | --- | --- |
| Exemplary Embodiment 1 | 10 μm | 8.4 |
| Exemplary Embodiment 2 | 4 μm | 21.2 |
| Exemplary Embodiment 3 | 6 μm | 11.8 |
| Exemplary Embodiment 4 | 15 μm | 6.7 |
| Comparative Example 3 | 10 μm | 33.3 |
| Comparative Example 4 | 10 μm | 35.9 |
| Comparative Example 5 | 10 μm | 39.1 |

Table 2 shows polarity that forms surface free energy of the positive active material of each of Exemplary Embodiments 1 to 4 and Comparative Examples 3 to 5. It can be observed that compared to Comparative Examples 3 and 4 where a single coating layer that includes Al or B is included, polarity that forms surface free energy is relatively low in Exemplary Embodiments 1 to 4 where the coating layer is formed as a complex coating layer that includes both of Al and B.

Further, it can be observed in Exemplary Embodiments 1 to 4 that polarity is changed depending on a diameter difference, and the polarity variation range is 5 to 30 mN/m.

Meanwhile, the difference in polarity that forms surface free energy can also be observed in comparison with Comparative Example 5, which is a conventional art.

As previously described, a low polarity decreases surface energy such that the surface of the positive active material can be prevented from being excessively wet by the electrolyte solution, thereby suppressing side reactions due to the electrolyte solution and suppressing a resistance increase of the battery, and such a characteristic is expected to be reflected to the battery characteristic of Exemplary Embodiment 1.

EPMA MAP Measurement

An Electron Probe X-ray Microanalyzer (EPMA) Map of the positive active material manufactured in Exemplary Embodiment 1 was measured.

Figure 3:
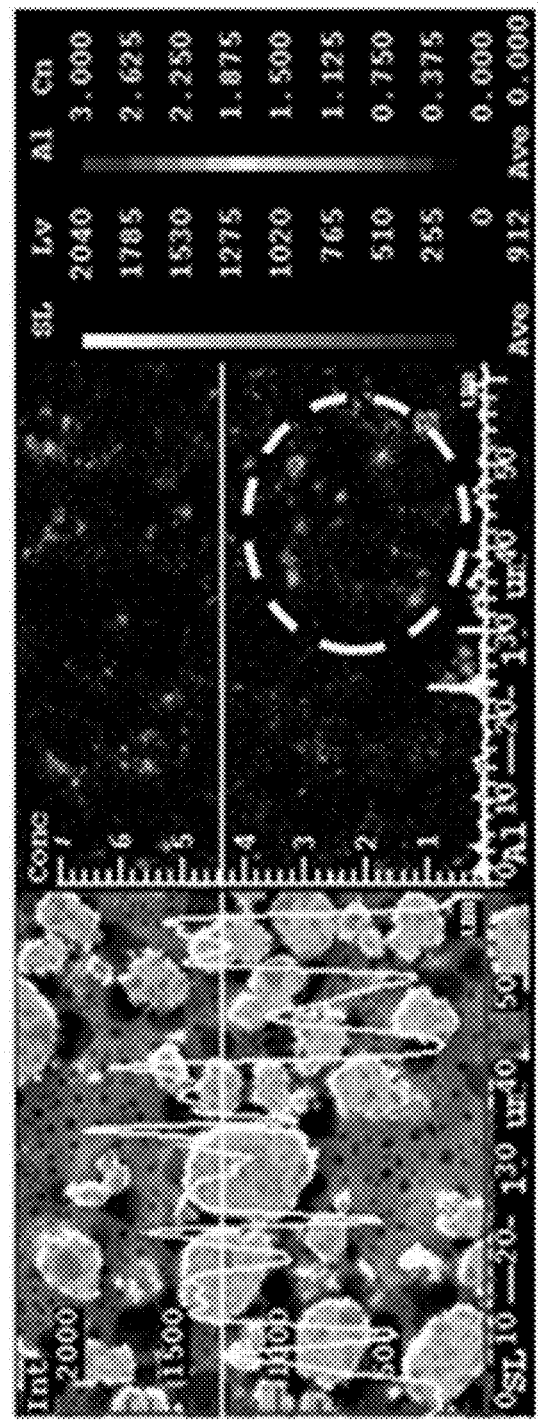
FIG. 3 is an electron probe X-ray micro-analyzer (EPMA) map of a positive active material manufacture in Exemplary Embodiment 1.

For the measurement, a Map Analysis was adopted and JXA-8500F manufactured by JEOL Ltd. was used. FIG. 3 shows a result of the measurement. It can be observed from FIG. 3 that an Al coating layer is coated as an island type such that the Al coating layer is partially located in the surface of the compound.

In such an island type of coating, as previously described, the coating layer is selectively reacted with a specific active site on the surface of the active material, thereby effectively controlling a side reaction, and a battery characteristic can be improved and thermal stability can also be improved.

XPS Measurement

Figure 4:
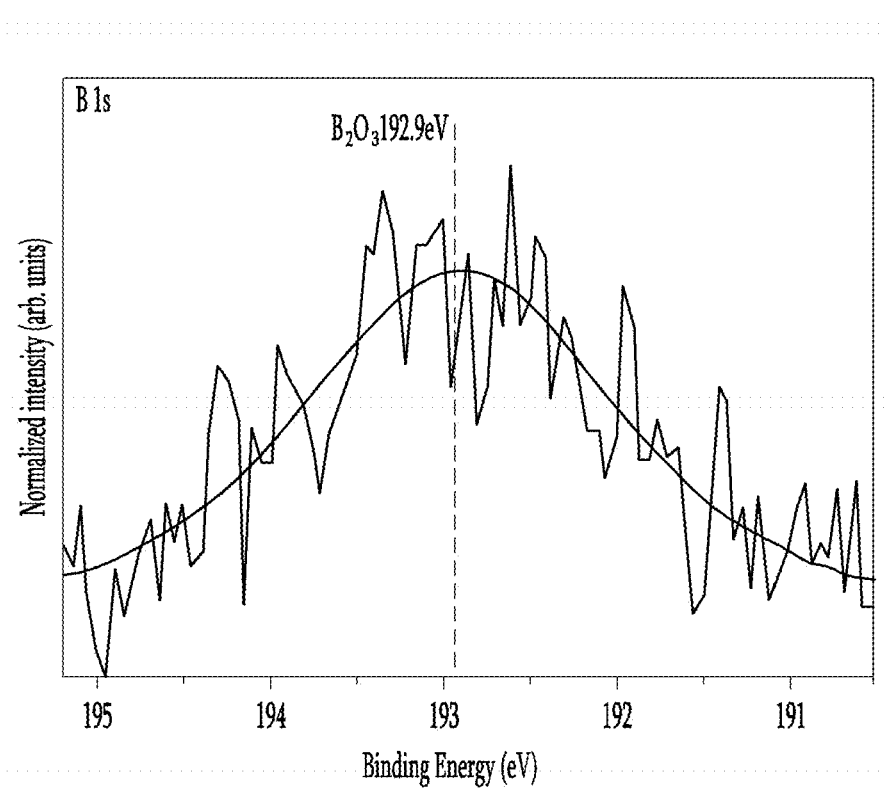
FIG. 4 shows an X-ray photoelectron spectroscopy (XPS) result of the positive active material manufactured in Exemplary Embodiment 1.

X-ray photoelectron spectroscopy (XPS) analysis was performed on the positive active material manufactured in Exemplary Embodiment 1, and FIG. 4 shows a result of the analysis. It can be observed from FIG. 4 that the coating layer includes N.

Figure 5:
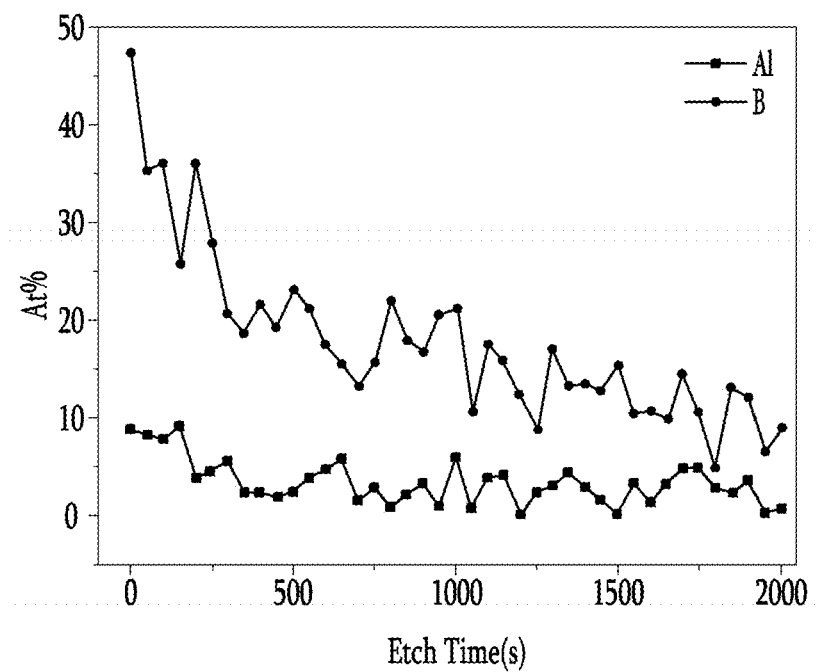
FIG. 5 shows an XPS depth profile result of the positive active material manufactured in Exemplary Embodiment 1.

In addition, FIG. 5 shows a depth profile. It can be observed from FIG. 5 that Al and B mostly exist in the coating layer, which is a surface portion, concentrations of Al and B are gradually decreased from the active material surface to a bulk direction, and B has a steeper concentration grade than Al.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Thus, exemplary embodiments described above are to be understood to be non-limiting.

That which is claimed:

1. A positive active material for a rechargeable lithium battery comprising a compound that is capable of reversibly intercalating or deintercalating lithium,
    wherein the compound is formed of a core portion and a coating layer,
    the core portion is doped with M, and
    the coating layer comprises a mixture of Al and B such that both Al and B are disposed on the core portion of the compound;
    wherein M is Zr, Ti, Mg, Ca, Al, B, V, Zn, Mo, Ni, Co, Mn, or a combination thereof; and
    wherein a surface polarity of the coating layer is 5 mN/m to 30 mN/m.

2. The positive active material of claim 1, wherein M is Zr, Ti, or a combination thereof.

3. The positive active material of claim 1, wherein a mole doping ratio of M is 0.001 to 0.01.

4. The positive active material of claim 1, wherein the compound is at least one of $Li_aA_{1-b}X_bD_2$ (0.90≤a≤1.8, 0≤b≤0.5), $Li_aA_{1-b}X_bO_{2-c}T_c$ (0.90≤a≤1.8, 0≤b≤0.5, 0≤c≤0.05), $LiE_{1-b}X_bO_{2-c}D_c$ (0≤b≤0.5, 0≤c≤0.05), $LiE_{2-b}X_bO_{4-c}T_c$ (0≤b≤0.5, 0≤c≤0.05), $Li_aNi_{1-b-c}Co_bX_cD_\alpha$ (0.90≤a≤1.8, 0≤b≤0.5, 0≤c≤0.05, 0<α≤2), $Li_aNi_{1-b-c}Co_bX_cO_{2-\alpha}T_\alpha$ (0.90≤a≤1.8, 0≤b≤0.5, 0≤c≤0.05, 0≤α≤2), $Li_aNi_{1-b-c}Co_bX_cO_{2-\alpha}T_2$ (0.90≤a≤1.8, 0≤b≤0.5, 0≤c≤0.05, 0<α<2), $Li_aNi_{1-b-c}Mn_bX_cD_\alpha$ (0.90≤a≤1.8, 0≤b≤0.5, 0≤c≤0.05, 0<α≤2), $Li_aNi_{1-b-c}Mn_bX_cO_{2-\alpha}T_\alpha$ (0.90≤a≤1.8, 0≤b≤0.5, 0≤c≤0.05, 0<α<2), $Li_aNi_{1-b-c}Mn_bX_cO_{2-\alpha}T_2$ (0.90≤a≤1.8, 0≤b≤0.5, 0≤c≤0.05, 0<α<2), $Li_aNi_bE_cG_dO_{2-e}T_e$ (0.90≤a≤1.8, 0≤b≤0.9, 0≤c≤0.5, 0.001≤d<0.1, 0≤e<0.05), $Li_aNi_bCo_cMn_dG_eO_{2-f}T_f$ (0.90≤a≤1.8, 0≤b≤0.9, 0≤c≤0.5, 0≤d<0.5, 0.001≤e≤0.1, 0≤f≤0.05), $Li_aNiG_bO_{2-c}T_c$ (0.90≤a≤1.8, 0.001≤b≤0.1, 0≤c≤0.05), $Li_aCoG_bO_{2-c}T_c$ (0.90≤a≤1.8, 0.001≤b≤0.1, 0≤c≤0.05), $Li_aMnG_bO_{2-c}T_c$ (0.90≤a≤1.8, 0.001≤b≤0.1, 0≤c≤0.05), $Li_aMn_2G_bO_{2-c}T_c$ (0.90≤a≤1.8, 0.001≤b≤0.1, 0≤c≤0.05), $Li_aMnG_bPO_4$ (0.90≤a≤1.8, 0.001≤b≤0.1), $LiNiVO_4$, and $Li_{(3-f)}J_2(PO_4)_3$ (0≤f≤2),
    wherein:
        A is Ni, Co, Mn, or a combination thereof,
        X is Al, Ni, Co, Mn, Cr, Fe, Mg, Sr, V, a rare earth element, or a combination thereof,
        D is O, F, S, P, or a combination thereof,
        E is Co, Mn, or a combination thereof,
        T is F, S, P, or a combination thereof,
        G is Al, Cr, Mn, Fe, Mg, La, Ce, Sr, V, or a combination thereof, and
        J is V, Cr, Mn, Co, Ni, Cu, or a combination thereof.

5. The positive active material of claim 1, wherein a weight ratio of a weight of the coating layer to a total weight of the entire positive active material is 0.05.

6. The positive active material of claim 1, wherein the coating layer is an island-type coating layer that is partially located on the core portion of the compound.

7. A rechargeable lithium battery comprising:
    a positive electrode including a positive active material of claim 1;
    a negative electrode including a negative active material; and
    an electrolyte.

8. A method for manufacturing the positive active material of claim 1, the method comprising:
    dry-mixing a lithium supply material, a transition metal precursor, and an M supply material;
    baking a first mixture to form a lithium complex compound;
    mixing the lithium complex compound, an Al supply material, and a B supply material;
    attaching a second mixture to the surface of the lithium complex compound;
    thermally treating the compound where the second mixture is attached; and
    acquiring the positive active material for the rechargeable lithium battery that includes the core portion doped with M and the coating layer disposed on the core portion and including Al and B,
    wherein M is Zr, Ti, Mg, Ca, Al, B, V, Zn, Mo, Ni, Co, Mn, or a combination thereof.

9. The method for manufacturing the positive active material of claim 8, wherein baking the first mixture to form the lithium complex compound comprises baking the first mixture at a baking temperature from 700° C. to 1,050° C.

10. The method for manufacturing the positive active material of claim 8, wherein thermally treating the compound where the second mixture is attached comprises thermally treating the compound at a thermal treatment temperature from 300° C. to 500° C.

* * * * *

UNITED STATES PATENT AND TRADEMARK OFFICE
CERTIFICATE OF CORRECTION

PATENT NO.         : 10,903,486 B2                                  Page 1 of 1
APPLICATION NO.    : 15/221249
DATED              : January 26, 2021
INVENTOR(S)        : Choi et al.

It is certified that error appears in the above-identified patent and that said Letters Patent is hereby corrected as shown below:

In the Claims

Column 15,
Line 30, Claim 4 "$0 \leq a \leq 2$" should read --$0 < a < 2$--.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*